United States Patent
Itoh et al.

(10) Patent No.: US 12,066,115 B2
(45) Date of Patent: Aug. 20, 2024

(54) ELECTROMAGNETIC VALVE MANIFOLD

(71) Applicant: CKD CORPORATION, Komaki (JP)

(72) Inventors: Shinji Itoh, Komaki (JP); Shinichi Okamoto, Komaki (JP); Ikuo Ogino, Komaki (JP)

(73) Assignee: CKD CORPORATION, Komaki (JP)

( * ) Notice: Subject to any disclaimer, the term of this patent is extended or adjusted under 35 U.S.C. 154(b) by 105 days.

(21) Appl. No.: 17/978,580

(22) Filed: Nov. 1, 2022

(65) Prior Publication Data
US 2023/0133598 A1   May 4, 2023

(30) Foreign Application Priority Data

Nov. 4, 2021   (JP) .................................. 2021-180382

(51) Int. Cl.
*F16K 11/07*   (2006.01)
*F16K 35/02*   (2006.01)
*F16K 35/06*   (2006.01)

(52) U.S. Cl.
CPC .......... *F16K 11/0704* (2013.01); *F16K 35/02* (2013.01); *F16K 35/06* (2013.01)

(58) Field of Classification Search
CPC ....... F16K 11/0704; F16K 35/06; F16K 35/02
See application file for complete search history.

(56) References Cited

U.S. PATENT DOCUMENTS

| | | | | |
|---|---|---|---|---|
| 4,353,394 A | * | 10/1982 | Loup ................... | F16K 11/0704 251/297 |
| 11,434,939 B2 | * | 9/2022 | Miyazoe ............. | F15B 13/0828 |
| 11,781,674 B2 | * | 10/2023 | Okamoto ............. | F16K 27/003 137/383 |

FOREIGN PATENT DOCUMENTS

| | | | | |
|---|---|---|---|---|
| DE | 202006014780 U1 | * | 1/2007 | .......... F16K 11/0704 |
| DE | 102007007645 B3 | * | 10/2008 | .......... F15B 13/0402 |
| EP | 2169273 A1 | * | 3/2010 | .......... F16H 61/0272 |
| JP | S5125836 A | | 3/1976 | |
| JP | S61-197364 U | | 12/1986 | |
| JP | H0135990 Y2 | * | 11/1989 | .............. F16K 31/11 |
| JP | 2004084941 A | | 3/2004 | |

OTHER PUBLICATIONS

DE-102007007645-B3 Translation (Year: 2008).*
DE-202006014780-U1 Translation (Year: 2006).*
EP-2169273-A1 Translation (Year: 2009).*
JP H0135990 Translation (Year: 1989).*
JP Office Action for corresponding JP Application No. 2021-180382, dated Mar. 30, 2024, 9 pgs.

* cited by examiner

*Primary Examiner* — Umashankar Venkatesan
(74) *Attorney, Agent, or Firm* — Tarolli, Sundheim, Covell & Tummino LLP

(57) ABSTRACT

An electromagnetic valve manifold includes an electromagnetic valve and a manifold base. The electromagnetic valve includes a manual shaft. The manual shaft is configured to be manually operated to be switched between a first switching position, in which the manual shaft allows movement of the valve member relative to the valve hole, and a second switching position in which the manual shaft restricts movement of the valve member relative to the valve hole. The manual shaft includes a projection that is projected into and retracted from the valve hole. The valve member includes at least one recess in an outer surface of the valve member. The manual shaft is configured such that, in a state in which the manual shaft is located in the second switching position, the projection is projected into the valve hole and engaged with the recess, so as to restrict movement of the valve member.

8 Claims, 7 Drawing Sheets

ELECTROMAGNETIC VALVE MANIFOLD

RELATED APPLICATIONS

The present invention is a U.S. Nonprovisional Patent Application claiming priority to Japanese Patent Application No. 2021-180382, filed on Nov. 4, 2021; the entirety of which is hereby incorporated herein by reference.

BACKGROUND

1. Field

The present disclosure relates to an electromagnetic valve manifold.

2. Description of Related Art

An electromagnetic valve manifold includes an electromagnetic valve and a manifold base, on which the electromagnetic valve is mounted. The manifold base includes a supply passage, an output passage, and a discharge passage. The electromagnetic valve includes a casing and a valve member. The casing includes a valve hole, a supply port, an output port, and a discharge port. The supply port, the output port, and the discharge port are each connected to the valve hole. The supply port is connected to the supply passage of the manifold base. The output port is connected to the output passage of the manifold base. The discharge port is connected to the discharge passage of the manifold base. The valve member is movably accommodated in the valve hole. The valve member moves within the valve hole, so as to switch connection state among the ports. The fluid flowing through the output passage drives a fluid pressure device connected to the output passage.

For example, Japanese Laid-Open Utility Model Publication No. 61-197364 discloses an electromagnetic valve manifold that includes a stopper valve arranged between a manifold base and an electromagnetic valve. The stopper valve includes a spool that is switched between a first switching position and a second switching position. For example, when switched to the first switching position, the spool allows for connection between the supply port and the supply passage, connection between the output port and the output passage, and connection between the discharge port and the discharge passage. In contrast, when switched to the second switching position, the spool blocks the connection between the supply port and the supply passage and the connection between the discharge port and the discharge passage. When in the second switching position, the spool allows for connection between the output port and the output passage. Thus, when in the second switching position, the spool only allows for the connection between the output port and the output passage. When in the second switching position, the spool blocks the connection between the discharge port and the discharge passage. Thus, the fluid in the output passage will not be discharged to the outside from the discharge passage through the output port and the discharge port. As a result, the pressure of the fluid between the output passage and the fluid pressure device is maintained, and operation of the fluid pressure device is stopped. Such an electromagnetic valve manifold switches the spool to the second switching position to keep the fluid pressure device deactivated, for example, when an operator performs maintenance. This allows the operator to perform maintenance safely.

In the above-described publication, for example, a pressure loss of the fluid may occur since the fluid flows through the stopper valve. Thus, the flow rate of the fluid supplied to and discharged from the fluid pressure device may be insufficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electromagnetic valve manifold is provided that includes an electromagnetic valve and a manifold base on which the electromagnetic valve is mounted. The manifold base includes a supply passage, an output passage, and a discharge passage. The electromagnetic valve includes a casing including a valve hole, a valve member that is movably accommodated in the valve hole, and a supply port, an output port, and a discharge port that are formed in the casing and respectively connected to the valve hole. The supply port is connected to the supply passage. The output port is connected to the output passage. The discharge port is connected to the discharge passage. The output passage is configured such that a fluid flowing through the output passage drives a fluid pressure device connected to the output passage. The electromagnetic valve includes a manual shaft. The manual shaft is configured to be manually operated to be switched between a first switching position, in which the manual shaft allows the valve member to move relative to the valve hole, and a second switching position, in which the manual shaft restricts movement of the valve member relative to the valve hole, thereby maintaining a pressure of a fluid between the output passage and the fluid pressure device. The manual shaft includes a projection that is projected into and retracted from the valve hole. The valve member includes at least one recess in an outer surface of the valve member. The manual shaft is configured such that, in a state in which the manual shaft is located in the second switching position, the projection is projected into the valve hole and engaged with the recess, so as to restrict movement of the valve member relative to the valve hole.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An electromagnetic valve manifold 10 according to one embodiment will now be described with reference to FIGS. 1 to 8.

<Overall Configuration of Electromagnetic Valve Manifold 10>

Figure 1:
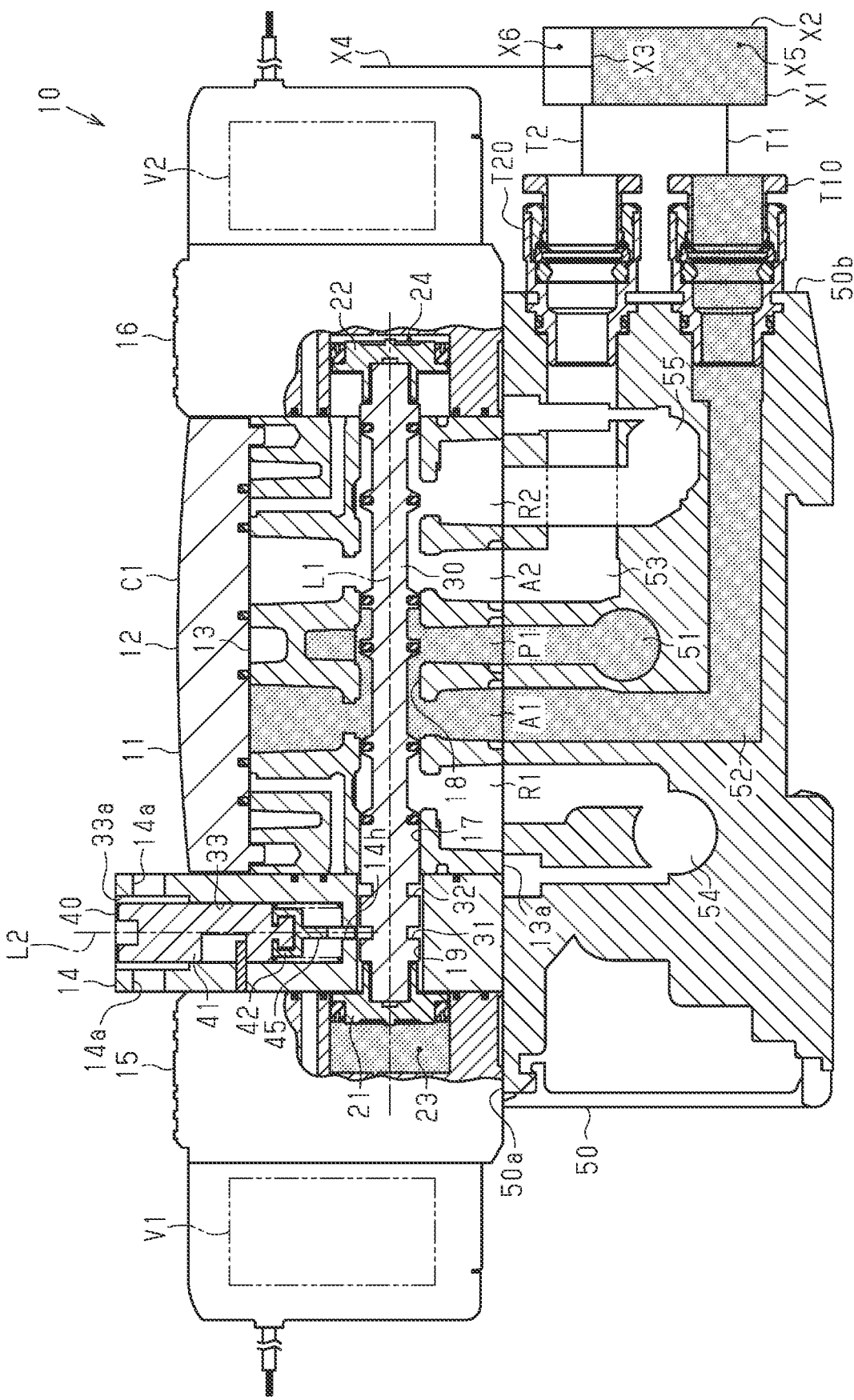
FIG. 1 is a cross-sectional view of an electromagnetic valve manifold according to one embodiment.

As shown in FIG. 1, the electromagnetic valve manifold 10 includes at least one electromagnetic valve 11 and a rectangular block-shaped manifold base 50. The electromagnetic valve 11 is mounted on a mounting surface 50a of the manifold base 50. The electromagnetic valve 11 is thus mounted on the manifold base 50. The electromagnetic valve 11 and the manifold base 50 form the electromagnetic valve manifold 10.

<Configuration of Electromagnetic Valve 11>

The electromagnetic valve 11 includes an elongated rectangular block-shaped casing C1. The casing C1 includes a valve casing 12 and an operation block 14. The valve casing 12 includes an elongated rectangular block-shaped casing body 13, a first coupling block 15, and a second coupling block 16.

The casing body 13 is made of, for example, an aluminum alloy. The operation block 14, the first coupling block 15, and the second coupling block 16 are made of, for example, plastic. The casing body 13 includes a body facing surface 13a, which faces the manifold base 50.

The operation block 14 is coupled to a first end face in the longitudinal direction of the casing body 13. The operation block 14 is coupled to the first end face in the longitudinal direction of the casing body 13 with a traverse direction of the operation block 14 agreeing with the longitudinal direction of the casing body 13. The first coupling block 15 is coupled to a first end face in the traverse direction of the operation block 14. The first end face in the traverse direction of the operation block 14 is on a side of the operation block 14 that is opposite to the casing body 13. The second coupling block 16 is coupled to a second end face in the longitudinal direction of the casing body 13.

<Valve Hole 17>

Figure 2:
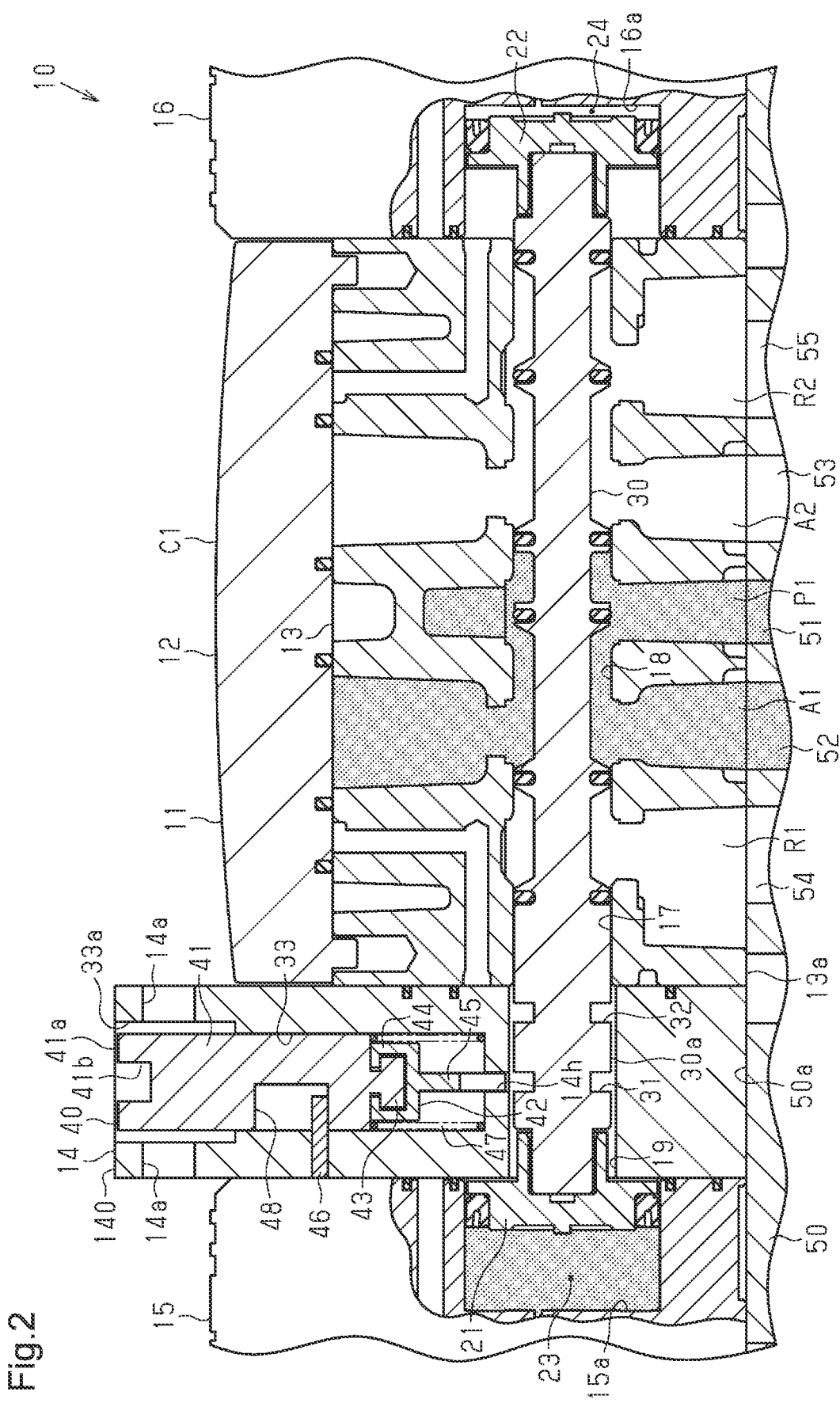
FIG. 2 is an enlarged partial cross-sectional view of the electromagnetic valve manifold shown in FIG. 1.

As shown in FIG. 2, the casing C1, specifically, the valve casing 12, includes a circular valve hole 17. The valve hole 17 includes a first valve hole 18 and a second valve hole 19. The first valve hole 18 is formed in the casing body 13. The first valve hole 18 extends in the longitudinal direction of the casing body 13. A first end of the first valve hole 18 opens in the first end face in the longitudinal direction of the casing body 13. A second end of the first valve hole 18 opens in the second end face in the longitudinal direction of the casing body 13. The first valve hole 18 thus extends through the casing body 13 in the longitudinal direction.

The second valve hole 19 is formed in the operation block 14. The second valve hole 19 extends through the operation block 14 in the traverse direction of the operation block 14. The second valve hole 19 is connected to first valve hole 18. The axis of the first valve hole 18 and the axis of the second valve hole 19 agree with each other. The first valve hole 18 and the second valve hole 19 extend in the longitudinal direction of the casing C1. The valve hole 17 thus extends in the longitudinal direction of the casing C1. An axis L1 of the valve hole 17 extends in the longitudinal direction of the casing C1. A first end of the valve hole 17 opens in the first end face in the traverse direction of the operation block 14. A second end of the valve hole 17 opens in the second end face in the longitudinal direction of the casing body 13. The valve hole 17 thus extends through the casing body 13 and the operation block 14. The valve hole 17 accommodates a spool valve 30, which is a valve member. The spool valve 30 is allowed to reciprocate within the valve hole 17. The spool valve 30 is thus movably accommodated in the valve hole 17.

The casing body 13 includes a supply port P1, a first output port A1, a second output port A2, a first discharge port R1, and a second discharge port R2, which are each connected to the first valve hole 18. The supply port P1, the first output port A1, the second output port A2, the first discharge port R1, and the second discharge port R2 are each connected to the valve hole 17.

Thus, the electromagnetic valve 11 includes the supply port P1, the first output port A1, the second output port A2, the first discharge port R1, and the second discharge port R2, which are formed in the casing C1 and connected to the valve hole 17. The first output port A1 and the second output port A2 are formed in the casing C1. Accordingly, the output ports include the first output port A1 and the second output port A2. The first discharge port R1 and the second discharge port R2 are formed in the casing C1. The electromagnetic valve 11 of the present embodiment is a five-port electromagnetic valve.

The first discharge port R1, the first output port A1, the supply port P1, the second output port A2, and the second discharge port R2 are arranged in that order from a first end to a second end in the longitudinal direction of the casing body 13. First ends of the supply port P1, the first output port A1, the second output port A2, the first discharge port R1, and the second discharge port R2 are each connected to the valve hole 17. Second ends of the supply port P1, the first output port A1, the second output port A2, the first discharge port R1, and the second discharge port R2 each open in the body facing surface 13a of the casing body 13.

<First Piston 21 and Second Piston 22>

The electromagnetic valve 11 includes a first piston 21 and a second piston 22. The first piston 21 has the shape of a disc. The first piston 21 is coupled to a first end of the spool valve 30. The first piston 21 moves integrally with the spool valve 30. The second piston 22 has the shape of a disc. The second piston 22 is coupled to a second end of the spool valve 30. The second piston 22 moves integrally with the spool valve 30.

<First Pilot Pressure Chamber 23 and Second Pilot Pressure Chamber 24>

The first coupling block 15 includes a first piston accommodating recess 15a, which is a circular hole. The first piston accommodating recess 15a accommodates the first piston 21, while allowing the first piston 21 to reciprocate. The first piston accommodating recess 15a and the first piston 21 define a first pilot pressure chamber 23. Pilot fluid is supplied to and discharged from the first pilot pressure chamber 23.

The second coupling block 16 includes a second piston accommodating recess 16a, which is a circular hole. The second piston accommodating recess 16a accommodates the second piston 22, while allowing the second piston 22 to reciprocate. The second piston accommodating recess 16a and the second piston 22 define a second pilot pressure chamber 24. Pilot fluid is supplied to and discharged from the second pilot pressure chamber 24.

As shown in FIG. 1, the electromagnetic valve 11 includes a first pilot valve V1 and a second pilot valve V2. The electromagnetic valve 11 is therefore a double-solenoid electromagnetic pilot valve. Voltage are applied to the first pilot valve V1 and the second pilot valve V2, for example, by an external controller (not shown) such as a programmable logic controller (PLC).

<First Position and Second Position>

The spool valve 30 is switchable between a first position and a second position. For example, there may be a case in which voltage is applied to the first pilot valve V1, and voltage is not applied to the second pilot valve V2. In this case, the first pilot valve V1 supplies compressed fluid, which is pilot fluid, from a fluid supply source (not shown) to the first pilot pressure chamber 23. The second pilot valve V2 discharges the pilot fluid in the second pilot pressure chamber 24 to the atmosphere. Accordingly, the spool valve 30 moves toward the second piston accommodating recess 16a. As a result, the spool valve 30 is switched to the first position, in which the supply port P1 is connected to the first output port A1, and the second output port A2 is connected to the second discharge port R2. Also, when the spool valve 30 is switched to the first position, the supply port P1 and the second output port A2 are disconnected from each other, and the first output port A1 and the first discharge port R1 are disconnected from each other. In FIG. 1, the parts through which the fluid flows are depicted with stippling.

Figure 3:
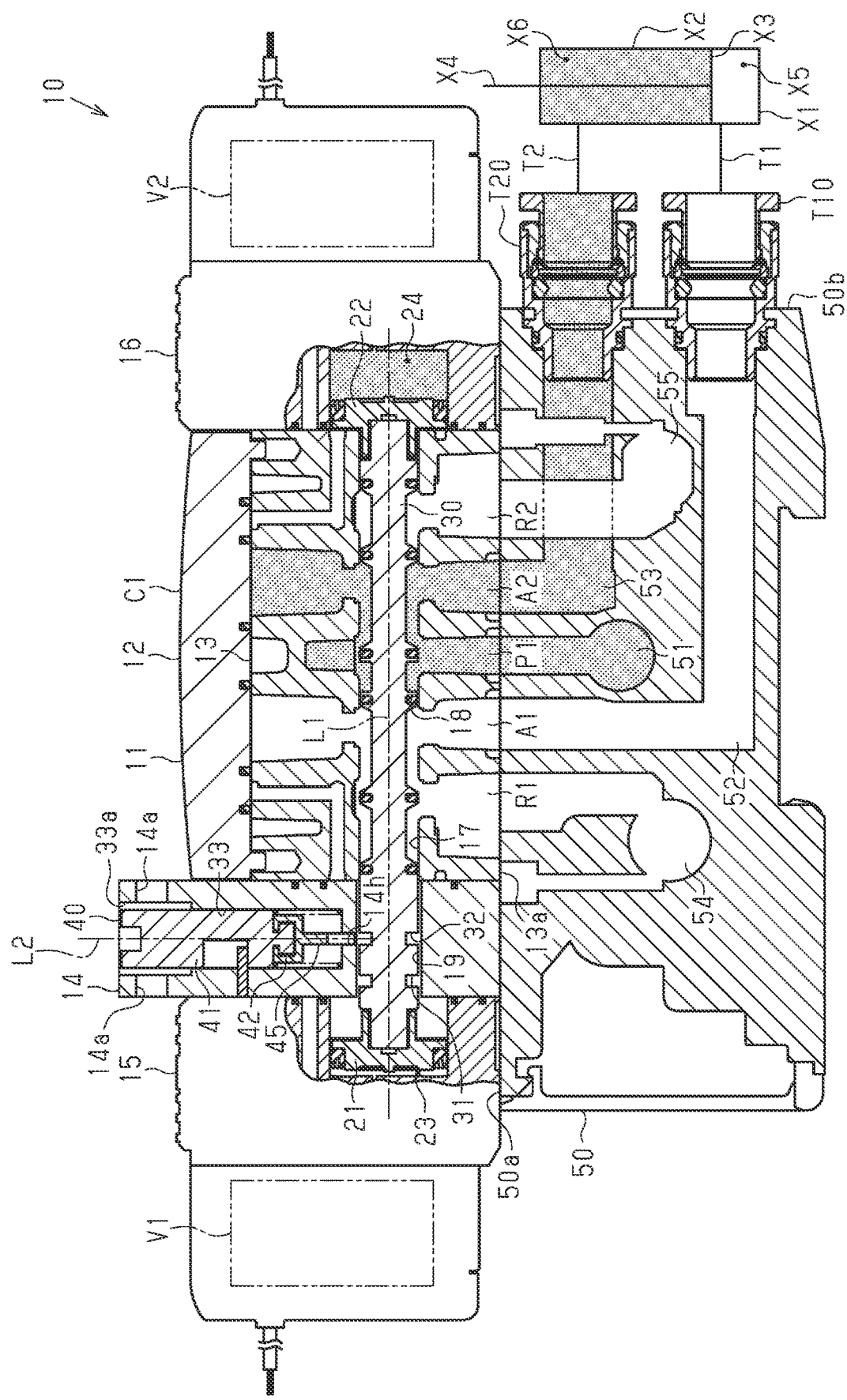
FIG. 3 is a cross-sectional view of the electromagnetic valve manifold of FIG. 1, showing flow of fluid when a spool valve is in a second position.

There may be a case in which voltage is not applied to the first pilot valve V1, and voltage is applied to the second pilot valve V2 as shown in FIG. 3. In this case, the second pilot valve V2 supplies compressed fluid, which is pilot fluid, from the fluid supply source to the second pilot pressure chamber 24. The first pilot valve V1 discharges the pilot fluid in the first pilot pressure chamber 23 to the atmosphere. Accordingly, the spool valve 30 moves toward the first piston accommodating recess 15a. As a result, the spool valve 30 is switched to the second position, in which the supply port P1 is connected to the second output port A2, and the first output port A1 is connected to the first discharge port R1. Also, when the spool valve 30 is switched to the second position, the supply port P1 and the first output port A1 are disconnected from each other, and the second output port A2 and the second discharge port R2 are disconnected from each other.

Thus, the first pilot valve V1 supplies pilot fluid to and discharges pilot fluid from the first pilot pressure chamber 23, and the second pilot valve V2 supplies pilot fluid to and discharges pilot fluid from the second pilot pressure chamber 24, so that the spool valve 30 reciprocates in the valve hole 17 between the first position and the second position. The connection state among the ports is switched as the spool valve 30 is switched between the first position and the second position.

<Configuration of Manifold Base 50>

As shown in FIGS. 1 and 2, the manifold base 50 includes a supply passage 51, a first output passage 52, a second output passage 53, a first discharge passage 54, and a second discharge passage 55. The first output passage 52 and the second output passage 53 are formed in the manifold base 50. Accordingly, the output passages include the first output passage 52 and the second output passage 53. The first discharge passage 54 and the second discharge passage 55 are formed in the manifold base 50. The supply passage 51, the first output passage 52, the second output passage 53, the first discharge passage 54, and the second discharge passage 55 each include a first end that opens in the mounting surface 50a. The supply port P1 is connected to the supply passage 51. The first output port A1 is connected to the first output passage 52. The second output port A2 is connected to the second output passage 53. Accordingly, the output ports include the first output port A1 and the second output port A2. The first discharge port R1 is connected to the first discharge passage 54. The second discharge port R2 is connected to the second discharge passage 55.

A second end of the supply passage 51 is connected to the fluid supply source (not shown) via piping and the like. A second end of the first output passage 52 is connected to an actuator X1, which is a fluid pressure device, through a first pipe T1. The first pipe T1 is connected to the manifold base 50 through a first coupling T10. A second end of the second output passage 53 is connected to the actuator X1 through a second pipe T2. The second pipe T2 is connected to the manifold base 50 through a second coupling T20. The second end of the first output passage 52 and the second end of the second output passage 53 are open in a wall surface 50b of the manifold base 50. A second end of the first discharge passage 54 and a second end of the second discharge passage 55 are open to the atmosphere.

The actuator X1 includes a cylinder tube X2. The cylinder tube X2 accommodates a piston X3, while allowing the piston X3 to reciprocate. A piston rod X4 is coupled to the piston X3. The piston rod X4 is selectively protruded from and retracted into the cylinder tube X2. The interior of the cylinder tube X2 is divided into a first pressure chamber X5 and a second pressure chamber X6 by the piston X3. The first output passage 52 is connected to the first pressure chamber X5 through the first pipe T1. The second output passage 53 is connected to the second pressure chamber X6 through the second pipe T2.

<First Recess 31 and Second Recess 32>

As shown in FIG. 2, the spool valve 30 includes a columnar protrusion 30a at a first end. The protrusion 30a includes a first recess 31 and a second recess 32 in the outer circumferential surface. Thus, the spool valve 30 has two recesses in the outer circumferential surface of the spool valve 30. Each of the first recess 31 and the second recess 32 extends over the entire circumference of the outer circumferential surface of the protrusion 30a. The first recess 31 and the second recess 32 are arranged in that order from the first end to the second end of the spool valve 30.

<Configuration of Shaft Hole 33>

The operation block 14 includes a circular shaft hole 33. The shaft hole 33 extends in the longitudinal direction of the operation block 14. A first end of the shaft hole 33 opens in a first end face 140, which is an end face in the longitudinal direction of the operation block 14. The shaft hole 33 thus includes an opening 33a, which opens in an end face of the casing C1.

<Insertion Hole 14h>

The operation block 14 includes an insertion hole 14h, which connects the valve hole 17 and the shaft hole 33 to each other. The casing C1 thus includes the insertion hole 14h. When the spool valve 30 is located in the first position, the insertion hole 14h is aligned with the first recess 31 in the longitudinal direction of the operation block 14. When the spool valve 30 is located in the second position, the insertion hole 14h is aligned with the second recess 32 in the longitudinal direction of the operation block 14 as shown in FIG. 3.

<Configuration of Manual Shaft 40>

As shown in FIG. 2, the electromagnetic valve 11 includes a manual shaft 40, which is movably received in the shaft hole 33. The casing C1 thus includes the shaft hole 33, which movably receives the manual shaft 40. The manual shaft 40 is columnar.

The manual shaft 40 includes a shaft body 41 and a stopper member 42. The shaft body 41 has a columnar shape. The shaft body 41 includes an anchor portion 43. The anchor portion 43 protrude from a first end of the shaft body 41, which is close to the insertion hole 14h.

Figure 4:
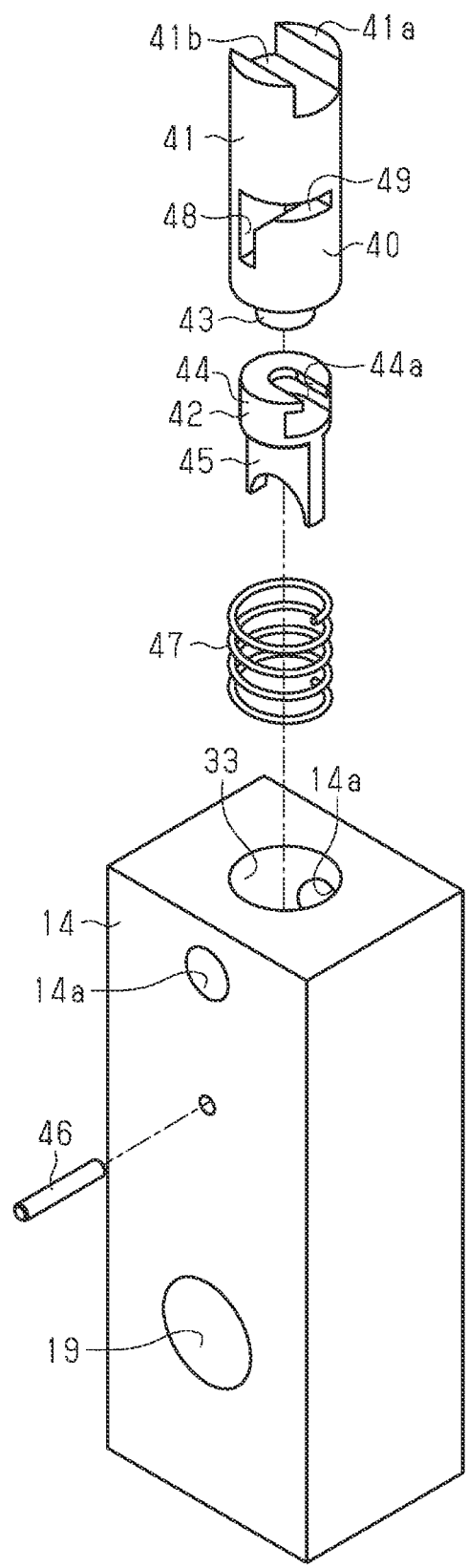
FIG. 4 is an exploded perspective view of an operation block of the electromagnetic valve manifold shown in FIG. 1.

As shown in FIG. 4, the stopper member 42 includes a substantially columnar holding portion 44 and a flat plate shaped projection 45. The holding portion 44 includes a slit 44a. The slit 44a is formed so as to extend from the center of the holding portion 44 to the outer circumferential surface and open in the outer circumferential surface in a plan view in the axial direction of the holding portion 44. The anchor portion 43 is slid into the slit 44a through the opening of the slit 44a so that the holding portion 44 of the stopper member 42 is held by the anchor portion 43. The stopper member 42 is thus attached to the first end of the shaft body 41. The stopper member 42 is movable integrally with the shaft body 41 within the shaft hole 33. The shaft body 41 is rotatable about the axis of the shaft body 41 relative to the stopper member 42.

Figure 5:
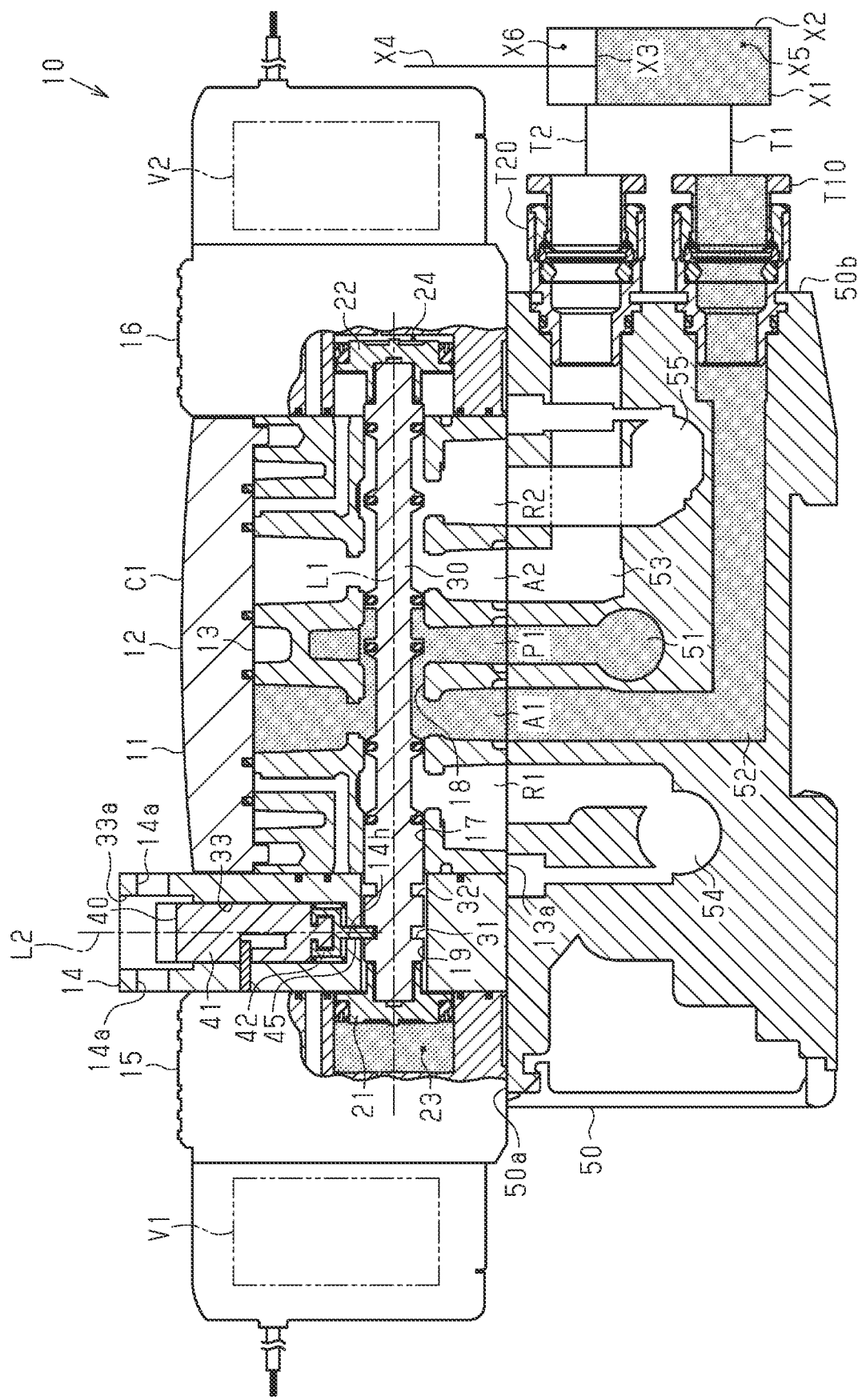
FIG. 5 is a cross-sectional view of the electromagnetic valve manifold of FIG. 1, showing flow of fluid when a manual shaft is in a second switching position.

The projection 45 projects from an end of the holding portion 44 that is close to the insertion hole 14h. The projection 45 can be inserted into the insertion hole 14h. When the shaft body 41 is pushed toward the insertion hole 14h, the projection 45 protrudes into the valve hole 17 through the insertion hole 14h. If the projection 45 projects into the valve hole 17 when the spool valve 30 is located in the first position, the projection 45 is engaged with the first recess 31 as shown in FIG. 5. If the projection 45 projects into the valve hole 17 when the spool valve 30 is located in the second position, the projection 45 is engaged with the second recess 32.

<First Switching Position and Second Switching Position>

The manual shaft 40 is manually operated through the opening 33a. The manual shaft 40 is switchable between the first switching position and the second switching position through manual operation.

When the manual shaft 40 is located in the first switching position, the projection 45 is retracted into the shaft hole 33 as shown in FIGS. 1 and 3. Accordingly, when in the first switching position, the manual shaft 40 allows the spool valve 30 to move relative to the valve hole 17.

When the manual shaft 40 is located in the second switching position, the projection 45 projects into the valve hole 17 through the insertion hole 14h as shown in FIG. 5. The insertion hole 14h guides the projection 45 when the manual shaft 40 moves between the first switching position and the second switching position. When the manual shaft 40 is located in the second switching position, and the spool valve 30 is located in the first position, the projection 45 of the stopper member 42 protrudes into the valve hole 17 via the insertion hole 14h so as to be engaged with the first recess 31. The manual shaft 40 thus restricts movement of the spool valve 30 relative to the valve hole 17. The spool valve 30 is therefore held in the first position.

When the manual shaft 40 is located in the second switching position, and the spool valve 30 is located in the second position, the projection 45 of the stopper member 42 protrudes into the valve hole 17 via the insertion hole 14h so as to be engaged with the second recess 32. The manual shaft 40 thus restricts movement of the spool valve 30 relative to the valve hole 17. The spool valve 30 is therefore held in the second position.

As such, if the manual shaft 40 is located in the second switching position when the spool valve 30 is located in the first position, the projection 45 protrudes into the valve hole 17 and is engaged with one of the first recess 31 and the second recess 32, so as to restrict movement of the spool valve 30 relative to the valve hole 17. If the manual shaft 40 is located in the second switching position when the spool valve 30 is located in the second position, the projection 45 protrudes into the valve hole 17 and is engaged with the other one of the first recess 31 and the second recess 32, so as to restrict movement of the spool valve 30 relative to the valve hole 17.

<Configuration of Fixing Pin 46 and Urging Spring 47>

Figure 6:
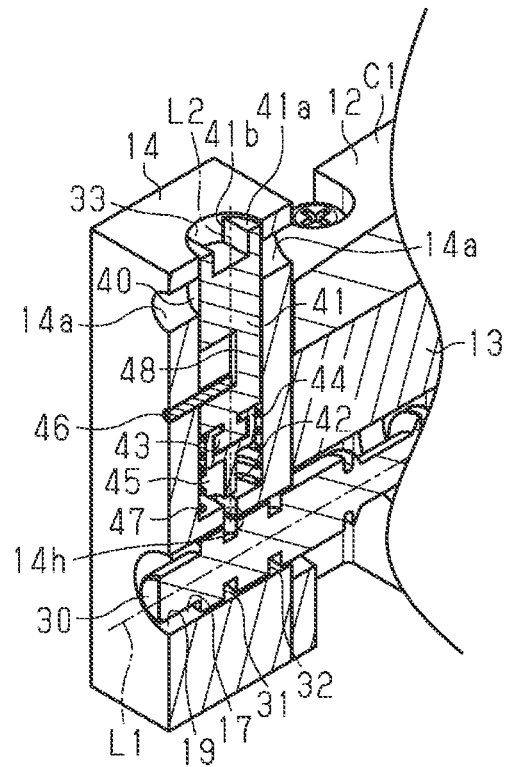
FIG. 6 is a perspective view, with a part cut away, of an operating member in the electromagnetic valve manifold of FIG. 1, illustrating a state in which the manual shaft is in a first switching position.
Figure 7:
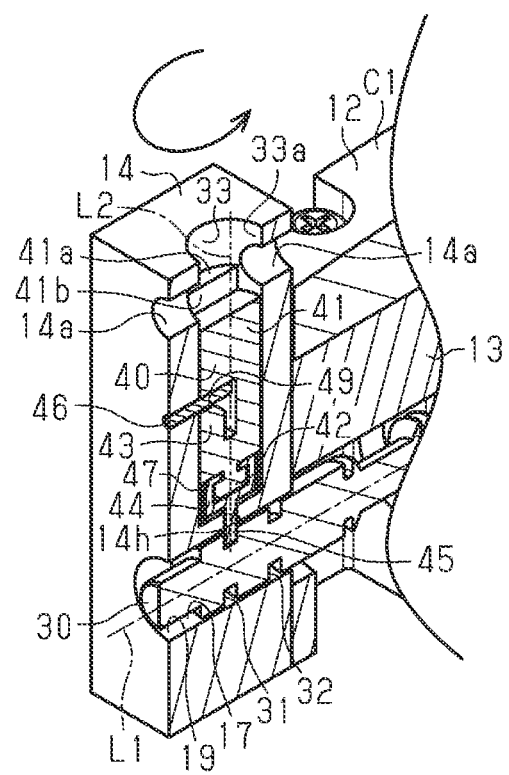
FIG. 7 is a perspective view, with a part cut away, of the operating member in the electromagnetic valve manifold of FIG. 1, illustrating a state in which the manual shaft is in a second switching position.

As shown in FIGS. 4, 6, and 7, the electromagnetic valve 11 includes a fixing pin 46, which is an insertion member, and an urging spring 47, which is an urging member. The fixing pin 46 has the shape of an elongated thin column. The fixing pin 46 protrudes into the shaft hole 33.

The urging spring 47 is accommodated in the shaft hole 33. The urging spring 47 is located between the operation block 14 and the manual shaft 40. A first end of the urging spring 47 is supported by the operation block 14. A second end of the urging spring 47 is supported by the shaft body 41. The urging spring 47 applies to the manual shaft 40 an urging force that urges the manual shaft 40 toward the first switching position.

<Configuration of Unlocking Slot 48 and Locking Slot 49>

The shaft body 41 includes an unlocking slot 48 and a locking slot 49. The manual shaft 40 thus includes the unlocking slot 48 and the locking slot 49. The unlocking slot 48 opens in the outer circumferential surface of the shaft body 41. The unlocking slot 48 extends in the axial direction of the shaft body 41. The circumferential width of the unlocking slot 48 is slightly larger than the outer diameter of the fixing pin 46.

The manual shaft 40 has an axis L2.

In a state in which the fixing pin 46 is in the unlocking slot 48, the unlocking slot 48 allows the shaft body 41 to move in the axis L2 relative to the shaft hole 33 and restricts rotation of the manual shaft 40 in the shaft hole 33 about the axis L2.

The locking slot 49 opens in the outer circumferential surface of the shaft body 41. The locking slot 49 extends in the circumferential direction of the shaft body 41. The locking slot 49 is continuous with one end of the unlocking slot 48. When the manual shaft 40 is moved from the first switching position to the second switching position against the urging force of the urging spring 47 with the fixing pin 46 in the unlocking slot 48, the locking slot 49 is located at the same position as the fixing pin 46 in the axial direction of the manual shaft 40. In this state, the locking slot 49 and the fixing pin 46 cooperate to allow the manual shaft 40 to rotate about the axis L2. That is, the fixing pin 46 is moved into the locking slot 49 so that the manual shaft 40 is permitted to rotate about the axis L2 in the shaft hole 33. When the fixing pin 46 is moved into the locking slot 49, the manual shaft 40 is prevented from being moved toward the first switching position by the urging force of the urging spring 47. In the present embodiment, the length in the circumferential direction of the locking slot 49 is set to allow the manual shaft 40 to rotate about the axis L2 by 90°.

<Through-Holes 14a>

As shown in FIGS. 2 and 4, the operation block 14 includes two through-holes 14a. The casing C1 thus includes the two through-holes 14a. As shown in FIG. 5, the two through-holes 14a are closer to the opening 33a in the axial direction of the manual shaft 40 than the manual shaft 40 located in the second switching position. The two through-holes 14a are located on opposite sides of the axis of the shaft hole 33. The two through-hole 14a have a common axis. The direction in which the axis of the two through-holes 14a extend is orthogonal to the axis of the shaft hole 33.

<Groove 41b>

As shown in FIG. 4, the shaft body 41 includes a groove 41b provided in an end face 41a at the second end. The groove 41b extends across the end face 41a of the shaft body 41. The groove 41b extends in the radial direction of the shaft body 41.

The groove 41b extends in a direction that is orthogonal to the axis of the through-hole 14a when the manual shaft 40 is in the first switching position. As shown in FIG. 7, the groove 41b extends along the axis of the through-holes 14a when the manual shaft 40 is in the second switching position and is prevented from moving toward the first switching position by the fixing pin 46 engaged with the locking slot 49.

<Padlock 60>

Figure 8:
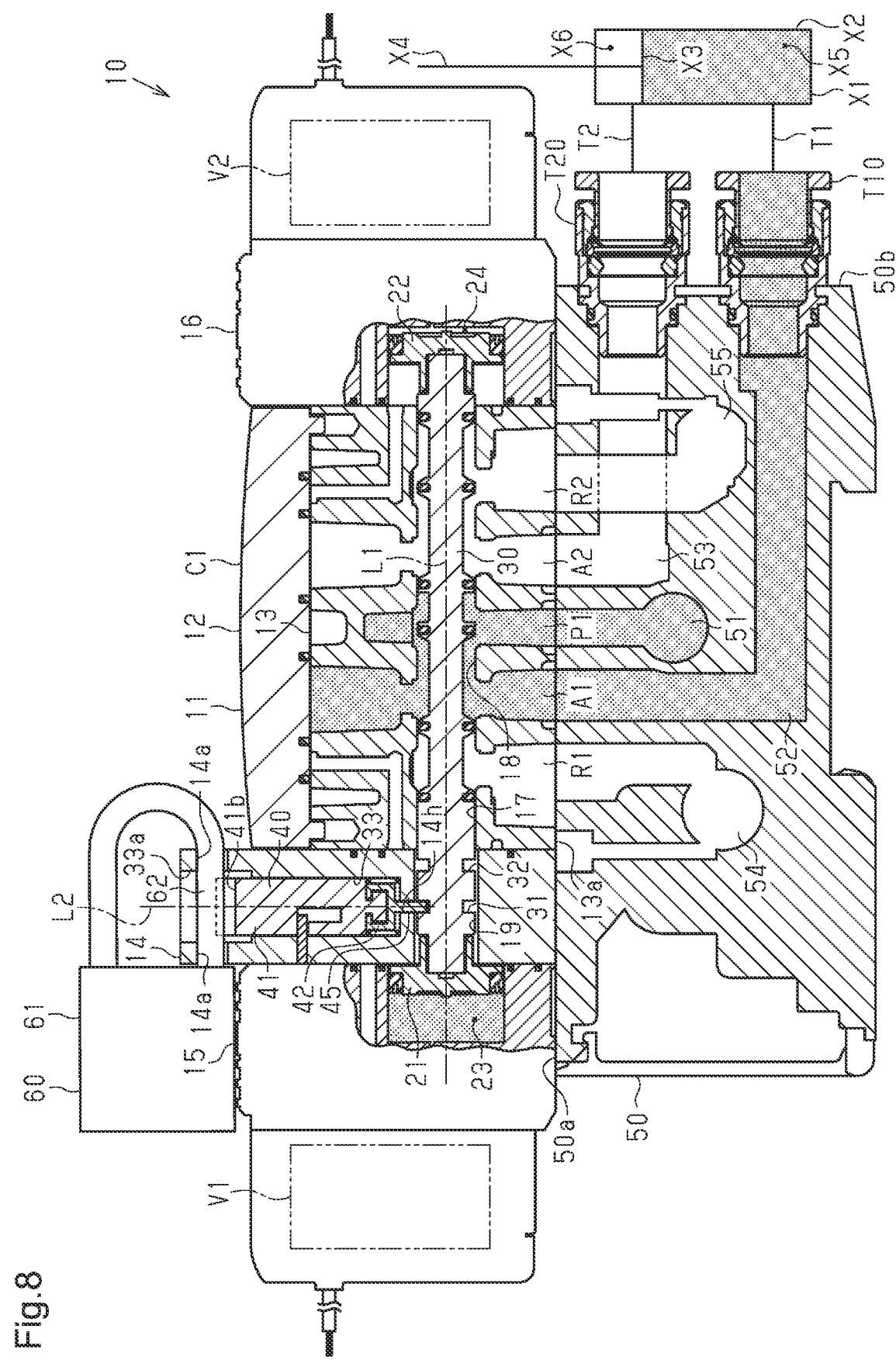
FIG. 8 is a cross-sectional view showing a state in which a padlock is attached to the operating member in the electromagnetic valve manifold of FIG. 1.

As shown in FIG. 8, a padlock 60, which is a locking member, can be attached to the electromagnetic valve 11 with the manual shaft 40 located in the second switching position. The padlock 60 includes a body 61 and a shackle 62. The shackle 62 has the shape of a U. In the present embodiment, the padlock 60 is attached to the electromagnetic valve 11 by inserting the shackle 62 into the two first through-holes 14a. The padlock 60 is locked up to prevent the manual shaft 40 from being manually operated. The shackle 62 traverses the opening 33a of the shaft hole 33. In other words, the shackle 62 partially blocks the opening 33a of the shaft hole 33. Thus, when the manual shaft 40 is in the second switching position, the shackle 62 of the padlock 60 can be inserted into the two through-holes 14a while partially blocking the opening 33a. The shackle 62 is engaged with the groove 41b. Thus, the groove 41b is an engagement portion with which the shackle 62, which partially blocks the opening 33a, is engaged.

When the manual shaft 40 is in the second switching position and is prevented from moving toward the first switching position, the shackle 62 is engaged with the groove 41b to prevent the manual shaft 40 from rotating. Therefore, the groove 41b extends along the axis of the two through-holes 14a when the manual shaft 40 is in the second switching position and is prevented from moving toward the first switching position.

<Operation>

Operation of the present embodiment will now be described.

For example, there may be a case in which voltage is applied to the first pilot valve V1, and voltage is not applied to the second pilot valve V2, so that the spool valve 30 is in the first position as shown in FIG. 1. At this time, if the manual shaft 40 has been switched to in the first switching position as shown in FIGS. 1 and 2, the fluid supplied by the fluid supply source is supplied to the first pressure chamber X5 of the actuator X1 through the piping, the supply passage 51, the supply port P1, the first output port A1, the first output passage 52, and the first pipe T1. When the fluid is supplied to the first pressure chamber X5, the piston X3 is pushed into the second pressure chamber X6, so that the piston rod X4 moves in a direction of protruding from the cylinder tube X2. Further, the fluid in the second pressure chamber X6 is discharged to the atmosphere through the second pipe T2, the second output passage 53, the second output port A2, the second discharge port R2, the second discharge passage 55, and the piping. In this manner, the actuator X1, which is connected to the first output passage 52 and the second output passage 53, is driven by the fluid flowing through the first output passage 52 and the second output passage 53.

When maintenance of the actuator X1 is performed, the operation of the actuator X1 must be stopped. The manual shaft 40 is thus manually switched from the first switching position to the second switching position. In the manual operation, the operator first pushes the manual shaft 40 through the opening 33a of the shaft hole 33 until the manual shaft 40 reaches the second switching position. At this time, the manual shaft 40 is pushed against the urging force of the urging spring 47 with the fixing pin 46 located in the unlocking slot 48. After the manual shaft 40 is moved from the first switching position to the second switching position, the manual shaft 40 is rotated 90° so as to move the fixing pin 46 into the locking slot 49. This restricts the manual shaft 40 from being moved toward the first switching position by the urging force of the urging spring 47. That is, the locking slot 49 and the fixing pin 46, which is engaged with the locking slot 49, maintain the manual shaft 40 in the second switching position. In a state in which the manual shaft 40 has been moved from the first switching position to the second switching position, the insertion hole 14h restricts the stopper member 42 and the shaft body 41 from rotating together when the shaft body 41 rotates in the shaft hole 33 about the axis.

For example, if the manual shaft 40 is switched from the first switching position to the second switching position when the spool valve 30 is located in the first position, the projection 45 protrudes into the valve hole 17 through the insertion hole 14h and is engaged with the first recess 31 as shown in FIG. 5. This restricts movement of the spool valve 30. The spool valve 30 is thus maintained in the first position. As a result, the pressure of the fluid between the first output passage 52 and the actuator X1 is maintained. The operation of the actuator X1 is thus stopped. Specifically, the actuator X1 is held in a state in which the piston X3 has moved to a first movement end, at which the volume of the second pressure chamber X6 is minimized.

For example, if the manual shaft 40 is switched from the first switching position to the second switching position when the spool valve 30 is located in the second position, the projection 45 protrudes into the valve hole 17 through the insertion hole 14*h* and is engaged with the second recess 32. This restricts movement of the spool valve 30. The spool valve 30 is thus maintained in the second position. As a result, the pressure of the fluid between the second output passage 53 and the actuator X1 is maintained. The operation of the actuator X1 is thus stopped. Specifically, the actuator X1 is held in a state in which the piston X3 has moved to a second movement end, at which the volume of the first pressure chamber X5 is minimized.

In this manner, the manual shaft 40 restricts movement of the spool valve 30 relative to the valve hole 17 so as to maintain the pressure of the fluid between the first output passage 52 and the actuator X1 or the pressure of the fluid between the second output passage 53 and the actuator X1. Further, since the manual shaft 40 prevents the spool valve 30 of the electromagnetic valve 11 from malfunctioning, the pressure of the fluid between the first output passage 52 and the actuator X1 or the pressure of the fluid between the second output passage 53 and the actuator X1 is unlikely to change. The operation of the actuator X1 is thus stopped reliably.

<Advantages>

The above-described embodiment has the following advantages.

(1) For example, if the manual shaft 40 is located in the second switching position when the spool valve 30 is located in the first position, the projection 45 protrudes into the valve hole 17 and is engaged with the first recess 31, so as to restrict movement of the spool valve 30 relative to the valve hole 17. Thereby, the pressure of the fluid between the first output passage 52 and the actuator X1 is maintained. The operation of the actuator X1 is thus stopped. Therefore, in order to stop the operation of the actuator X1, it is not necessary, for example, to interpose a stopper valve between the electromagnetic valve 11 and the manifold base 50 as in the related art. Hence, unlike the related art, a pressure loss of the fluid does not occur due to the flow of fluid via a stopper valve. As a result, a sufficient flow rate of the fluid supplied to and discharged from the actuator X1 is ensured. In this manner, the operation of the actuator X1 is stopped while ensuring a sufficient flow rate of fluid supplied to and discharged from the actuator X1.

(2) The padlock 60 can be attached to the electromagnetic valve 11 with the manual shaft 40 located in the second switching position. When located in the second switching position, the manual shaft 40 cannot be operated manually if the padlock 60 is attached to the electromagnetic valve 11. This prevents the operator from accidentally moving the manual shaft 40 from the second switching position to the first switching position. If the operator locks up the padlock 60 attached to the electromagnetic valve 11, the manual shaft 40 is prevented from being operated manually by a third person against the will of the operator. Accordingly, the reliability of the electromagnetic valve manifold 10 is improved.

(3) When the manual shaft 40 is in the second switching position, the shackle 62 of the padlock 60 is inserted into the two through-holes 14*a* while partially blocking the opening 33*a*. With this configuration, when the padlock 60 is attached to the electromagnetic valve 11, the shackle 62 of the padlock 60 is inserted into the two through-holes 14*a*. This stabilizes the attachment of the padlock 60 to the electromagnetic valve 11. Further, the padlock 60 is attached to the electromagnetic valve 11 with the shackle 62 of the padlock 60 partially blocking the opening 33*a* of the shaft hole 33. The shackle 62 of the padlock 60 traverses the opening 33*a*. The padlock 60 thus prevents the manual shaft 40 located in the second switching position from being manually operated through the opening 33*a* of the shaft hole 33.

(4) After the manual shaft 40 is moved from the first switching position to the second switching position against the urging force of the urging spring 47 with the fixing pin 46 in the unlocking slot 48, the fixing pin 46 is moved into the locking slot 49 to allow the manual shaft 40 to rotate. When the fixing pin 46 is moved into the locking slot 49, the manual shaft 40 is prevented from moving toward the first switching position and is maintained in the second switching position. Further, the shackle 62 of the padlock 60 is engaged with the groove 41*b* of the manual shaft 40 when the manual shaft 40 is located in the second switching position. This restricts the manual shaft 40 from rotating in the second switching position. The manual shaft 40 is thus prevented from rotating in the second switching position against the will of the operator. Therefore, the manual shaft 40 is prevented from moving from the second switching position to the first switching position by the urging force of the urging spring 47 against the will of the operator. As a result, the manual shaft 40 will not be switched to the first switching position accidentally. Accordingly, the reliability of the electromagnetic valve manifold 10 is further improved.

(5) The two through-hole 14*a* have a common axis. The groove 41*b* extends along the axis of the two through-holes 14*a* when the manual shaft 40 is in the second switching position. Thus, the shackle 62 of the padlock 60, which is passed through the two through-holes 14*a* and traverses the opening 33*a* of the shaft hole 33, can be easily engaged with the first groove 41*b*.

(6) Since the projection 45 has the shape of a flat plate, it is easy to ensure a contact area between the projection 45 and the first recess 31 or the second recess 32. Therefore, movement of the spool valve 30 relative to the valve hole 17 is easily restricted by causing the projection 45 to be engaged with the first recess 31 or the second recess 32. Also, the insertion hole 14*h* guides the projection 45 when the manual shaft 40 moves between the first switching position and the second switching position. After the manual shaft 40 is moved from the first switching position to the second switching position, the insertion hole 14*h* restricts the stopper member 42 and the shaft body 41 from rotating together when the shaft body 41 rotates in the shaft hole 33 about the axis. Therefore, the projection 45 is properly engaged with the first recess 31 or the second recess 32 when the manual shaft 40 is located in the second switching position.

(7) The manual shaft 40 is capable of restricting movement of the spool valve 30 relative to the valve hole 17 when the spool valve 30 is located in the first position. The manual shaft 40 is also capable of restricting movement of the spool valve 30 relative to the valve hole 17 when the spool valve 30 is located in the second position. Thus, the actuator X1 is in one of two states when the actuator X1 is not operating. Therefore, it is possible to appropriately select the state of the actuator X1 when the actuator X1 is not operating.

(8) In the present embodiment, it is not necessary, for example, to interpose a stopper valve between the electromagnetic valve 11 and the manifold base 50 as in the related art. Accordingly, the size of the electromagnetic valve manifold 10 in the mounting direction is reduced as compared with a case in which a stopper valve is interposed between the electromagnetic valve 11 and the manifold base 50.

Modifications

The above-described embodiment may be modified as follows. The above-described embodiment and the following modifications can be combined as long as the combined modifications remain technically consistent with each other.

In above-described embodiment, for example, when multiple electromagnetic valves 11 are arranged side by side, a common padlock may be used for all the electromagnetic valves 11. The shackle of the common padlock is passed through the through-holes 14a of all the electromagnetic valves 11 and is engaged with the grooves 41b of all the manual shafts 40. This eliminates the necessity to operate multiple padlocks prepared for each of the electromagnetic valves 11. This simplifies the procedure.

In the above-described embodiment, the first recess 31 or the second recess 32 may be omitted as long as the spool valve 30 includes at least one recess in the outer surface of the spool valve 30.

In the above-described embodiment, the spool valve 30 may further include a third recess. In this case, the projection 45 is engaged with the third recess when the spool valve 30 is located in a neutral position. The third recess is located between the first recess 31 and the second recess 32. Thus, the actuator X1 is in one of three states when the actuator X1 is not operating. Therefore, it is possible to appropriately select the state of the actuator X1 when the actuator X1 is not operating.

In the above-described embodiment, the electromagnetic valve manifold 10 does not necessarily need to be configured such that the operation block 14 is a separate component from the valve casing 12, but may be configured such that a structure equivalent to the operation block 14 is integrally formed with the valve casing 12. In this case, the shaft hole 33 is formed in the valve casing 12. Also, the shaft hole 33 is accommodated in the manual shaft 40.

In the above-described embodiment, the two through-holes 14a do not necessarily need to have a common axis. This modification is possible if the shackle 62 of the padlock 60 inserted into the through-holes 14a is engaged with part of the manual shaft 40.

In the above-described embodiment, the padlock 60 does not necessarily need to be attached to the electromagnetic valve 11.

In the above-described embodiment, the electromagnetic valve 11 may be a four-port electromagnetic valve from which, for example, the second discharge port R2 is omitted. That is, any type of electromagnetic valve may be used as the electromagnetic valve 11 as long as the electromagnetic valve 11 includes at least one discharge port. The electromagnetic valve 11 may be a three-port electromagnetic valve that includes a supply port, an output port, and a discharge port.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electromagnetic valve manifold, comprising:
an electromagnetic valve; and
a manifold base on which the electromagnetic valve is mounted, the manifold base including a supply passage, an output passage, and a discharge passage, wherein
the electromagnetic valve includes:
a casing including a valve hole;
a valve member that is movably accommodated in the valve hole; and
a supply port, an output port, and a discharge port that are formed in the casing and respectively connected to the valve hole,
the supply port is connected to the supply passage,
the output port is connected to the output passage,
the discharge port is connected to the discharge passage,
the output passage is configured such that a fluid flowing through the output passage drives a fluid pressure device connected to the output passage,
the electromagnetic valve includes a manual shaft,
the manual shaft is configured to be manually operated to be switched between a first switching position, in which the manual shaft allows the valve member to move relative to the valve hole, and a second switching position, in which the manual shaft restricts movement of the valve member relative to the valve hole, thereby maintaining a pressure of a fluid between the output passage and the fluid pressure device,
the manual shaft includes a projection that is projected into and retracted from the valve hole,
the valve member includes at least one recess in an outer surface of the valve member, and
the manual shaft is configured such that, in a state in which the manual shaft is located in the second switching position, the projection is projected into the valve hole and engaged with the recess, so as to restrict movement of the valve member relative to the valve hole.

2. The electromagnetic valve manifold according to claim 1, wherein the electromagnetic valve is configured such that a locking member is attached to the electromagnetic valve so as to prevent the manual shaft, when located in the second switching position, from being manually operated.

3. The electromagnetic valve manifold according to claim 2, wherein
the casing includes a shaft hole that movably receives the manual shaft,
the shaft hole includes an opening that opens in a surface of the casing,
the manual shaft is configured to be manually operated through the opening,
the casing includes two through-holes that are connected to the shaft hole,
the two through-holes are closer to the opening, in an axial direction of the manual shaft, than the manual shaft when the manual shaft is located in the second switching position,
the two through-holes are located on opposite sides of an axis of the shaft hole,
the locking member includes a padlock, and
the two through-holes are configured such that, when the manual shaft is located in the second switching position, a shackle of the padlock is passed through the two through-holes with the shackle partially blocking the opening.

4. The electromagnetic valve manifold according to claim 3, wherein
the electromagnetic valve includes:
an insertion member that protrudes inward from the shaft hole; and
an urging member that is accommodated in the shaft hole and applies to the manual shaft an urging force that urges the manual shaft toward the first switching position,
the manual shaft includes an unlocking slot and a locking slot, the insertion member being permitted to be moved into the unlocking slot and the locking slot,
the unlocking slot is configured to, with the insertion member in the unlocking slot, allow the manual shaft to move in the axial direction of the manual shaft relative to the shaft hole, and prevent the manual shaft from rotating about an axis of the manual shaft in the shaft hole, and
the locking slot is configured to, with the manual shaft located in the second switching position and the insertion member in the locking slot, allow the manual shaft to rotate about the axis of the manual shaft in the shaft hole, and prevent the manual shaft from moving toward the first switching position.

5. The electromagnetic valve manifold according to claim 4, wherein
the manual shaft includes an engagement portion, the engagement portion being configured such that the shackle partially blocking the opening is engaged with the engagement portion, so as to prevent the manual shaft from rotating, and
the manual shaft is configured such that the shackle is engaged with the engagement portion when the manual shaft is in the second switching position and the locking slot prevents the manual shaft from moving toward the first switching position.

6. The electromagnetic valve manifold according to claim 5, wherein
the two through-holes have a common axis,
the engagement portion includes a groove formed in an end face of the manual shaft, and
the groove extends along the axis of the two through-holes when the manual shaft is in the second switching position and the locking hole prevents the manual shaft from moving toward the first switching position.

7. The electromagnetic valve manifold according to claim 4, wherein
the manual shaft includes:
a shaft body that includes the unlocking slot and the locking slot; and
a stopper member that includes the projection and is movable integrally with the shaft body in the shaft hole, the stopper member being attached to an end of the shaft body that is close to the valve hole,
the projection has a shape of a flat plate,
the shaft body is configured to be rotatable relative to the stopper member about an axis of the shaft body,
the casing includes an insertion hole that connects the valve hole and the shaft hole, and is capable of receiving the projection,
the insertion hole is configured to guide the projection when the manual shaft moves between the first switching position and the second switching position, and restrict the stopper member and the shaft body from rotating together when the shaft body rotates in the shaft hole about the axis of the shaft body.

8. The electromagnetic valve manifold according to claim 1, wherein
the output passage includes a first output passage and a second output passage,
the output port includes a first output port that is connected to the first output passage and a second output port that is connected to the second output passage, and
the valve member is switchable between
a first position in which the supply port and the first output port are connected to each other, the second output port and the discharge port are connected to each other, the supply port and the second output port are disconnected from each other, and the first output port and the discharge port are disconnected from each other, and
a second position in which the supply port and the second output port are connected to each other, the first output port and the discharge port are connected to each other, the supply port and the first output port are disconnected from each other, and the second output port and the discharge port are disconnected from each other,
the recess in the outer surface of the valve member includes a first recess and a second recess, and
the manual shaft is configured such that
if the manual shaft is located in the second switching position when the valve member is located in the first position, the projection is engaged with the first recess to restrict movement of the valve member relative to the valve hole, and
if the manual shaft is located in the second switching position when the valve member is located in the second position, the projection is engaged with the second recess to restrict movement of the valve member relative to the valve hole.

* * * * *